US009471226B2

(12) United States Patent
Tsirkin (10) Patent No.: US 9,471,226 B2
(45) Date of Patent: Oct. 18, 2016

(54) REVERSE COPY ON WRITE FOR BETTER CACHE UTILIZATION (71) Applicant: Red Hat Israel, Ltd., Ra'anana (IL)

(72) Inventor: Michael S. Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 185 days.

(21) Appl. No.: 14/193,620

(22) Filed: Feb. 28, 2014

(65) Prior Publication Data
US 2015/0248237 A1 Sep. 3, 2015

(51) Int. Cl.
*G06F 3/06* (2006.01)
*G06F 12/10* (2016.01)

(52) U.S. Cl.
CPC .............. *G06F 3/061* (2013.01); *G06F 3/065* (2013.01); *G06F 3/067* (2013.01); *G06F 12/10* (2013.01); *G06F 12/109* (2013.01); *G06F 12/1009* (2013.01)

(58) Field of Classification Search
None
See application file for complete search history.

(56) References Cited

U.S. PATENT DOCUMENTS

| 6,986,015 B2 | 1/2006 | Testardi |
| 7,325,107 B2* | 1/2008 | Mather ................. G06F 12/109 711/133 |
| 7,409,694 B2 | 8/2008 | Forin et al. |
| 8,521,963 B1 | 8/2013 | Miao et al. |
| 2011/0314233 A1* | 12/2011 | Yan .................... G06F 17/30501 711/154 |
| 2011/0320789 A1* | 12/2011 | Prasky ................. G06F 9/3806 712/238 |
| 2013/0159639 A1* | 6/2013 | Corrie ..................... G06F 12/00 711/154 |
| 2014/0040563 A1* | 2/2014 | Lee ..................... G06F 12/0815 711/141 |

FOREIGN PATENT DOCUMENTS

JP     H-0444140 A     2/1992

OTHER PUBLICATIONS

Garimella, Neeta. "Understanding and exploiting snapshot technology for data protection, Part 1: Snapshot technology overview" Apr. 26, 2006. Retrieved from http://www.ibm.com/developerworks/tivoli/library/t-snaptsm1/.*

(Continued)

*Primary Examiner* — Daniel Tsui
(74) *Attorney, Agent, or Firm* — Haynes & Boone, LLP (57) ABSTRACT Methods, systems, and computer program products for providing reverse copy-on-write for improved cache utilization are disclosed. Examples generally relate to both physical and virtualized computer systems. A computer-implemented method may include detecting when a first task is to write to a memory page that is shared with a second task, creating a copy of the memory page for use by the second task, and modifying a memory mapping to associate the second task with the copy of the memory page. In a virtualized computer system, a hypervisor may detect when a first virtual machine is to write to a memory page shared with a second virtual machine, create a copy of the memory page for the second virtual machine, and adjust a memory mapping to associate the second virtual machine with the copy of the memory page.

41 Claims, 5 Drawing Sheets

(56) References Cited

OTHER PUBLICATIONS

Miscellaneous Topics in Memory Management, University of Rochester, http://www.cs.rochester.edu/~scott/456/notes/08-mem_misc, Feb. 16, 2000, 11 pages.

Vrable, Michael et al., Scalability, Fidelity, and Containment in the Potemkin Virtual Honeyfarm, Collaborative Center for Internet Epidemiology and Defenses Department of Computer Science and Engineering University of California, Oct. 23-26, 2005, 15 pages.

Milos, Grzegorz et al., Satori: Enlightened Page Sharing, University of Cambridge Computer Laboratory Cambridge; NVIDIA Corporation, Bedford, Massachusetts, 2009, 14 pages.

Nanavati, Mihir et al., Whose Cache Line is it Anyway? Operating System Support for Live Detection and Repair of False Sharing, Department of Computer Science, University of British Columbia, Aug. 15-17, 2013, 14 pages.

\* cited by examiner

REVERSE COPY ON WRITE FOR BETTER CACHE UTILIZATION

TECHNICAL FIELD

Examples of the present disclosure generally relate to memory management, and more specifically, relate to improving cache utilization using reverse copy-on-write operations.

BACKGROUND

In computer systems, shared memory may refer to memory that can be accessed simultaneously by different resources, such as computer hardware or software. In computer hardware, shared memory is generally random access memory (RAM) that is accessible from different central processing units (CPUs) in a multi-processor system. In computer software, shared memory generally refers to an area of RAM that is accessible to multiple processes or threads. In software systems, such availability allows a single copy of data to service multiple resources, instead of providing a separate copy of the data for each specific resource.

Virtual memory generally refers to a method of memory management where virtual memory addresses are mapped to physical memory addresses of a computer system. An operating system usually manages virtual address spaces and assignment of physical memory to virtual memory. Memory address translation is usually performed by a memory management unit (MMU) of a CPU. In virtual memory management, data sharing between different processes is usually implemented by mapping a virtual address of each different process to the same physical memory address so that each process accesses the same copy of data.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Disclosed herein are systems, methods, and computer program products for providing improved cache utilization and performance using reverse copy-on-write operations.

In an example, a first task shares a memory page with one or more other tasks. A memory management module of an operating system detects when the first task is to write to the memory page. The memory management module determines that a second task is sharing the memory page with the first task. The memory management module then performs a reverse copy-on-write operation to allow the first task to apply the write to the memory page.

In one example, the memory management module performs a reverse copy-on-write by creating a duplicate copy of the memory page for the second task (and other tasks, if any). The memory management module then modifies a memory mapping associated with the second task to associate the second task with the new copy of the memory page. The memory management module also may modify memory-mapping information for other tasks that share the original memory page with the first task so that the other tasks are redirected to the same new copy of the memory page. The memory management module then may update access permission of the original memory page to allow the first task to complete the write.

A reverse copy-on-write operation generally seeks to redirect tasks that share a memory page with an active task that is to update the shared memory page by redirecting the non-updating tasks to a new copy of the original memory page. Reverse copy-on-write provides improved cache utilization and performance by preserving existing cached memory mappings for the first task, which otherwise would be invalidated and require separate lookup and caching if the original memory mappings were altered. In addition, non-caching operations may be used to create a new copy of a memory page for other tasks while deferring caching of those memory mappings and corresponding data until needed at a later time. In similar examples, a memory management module of a hypervisor performs reverse copy-on-write operations involving multiple, different virtual machines sharing a memory page.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

Figure 1:
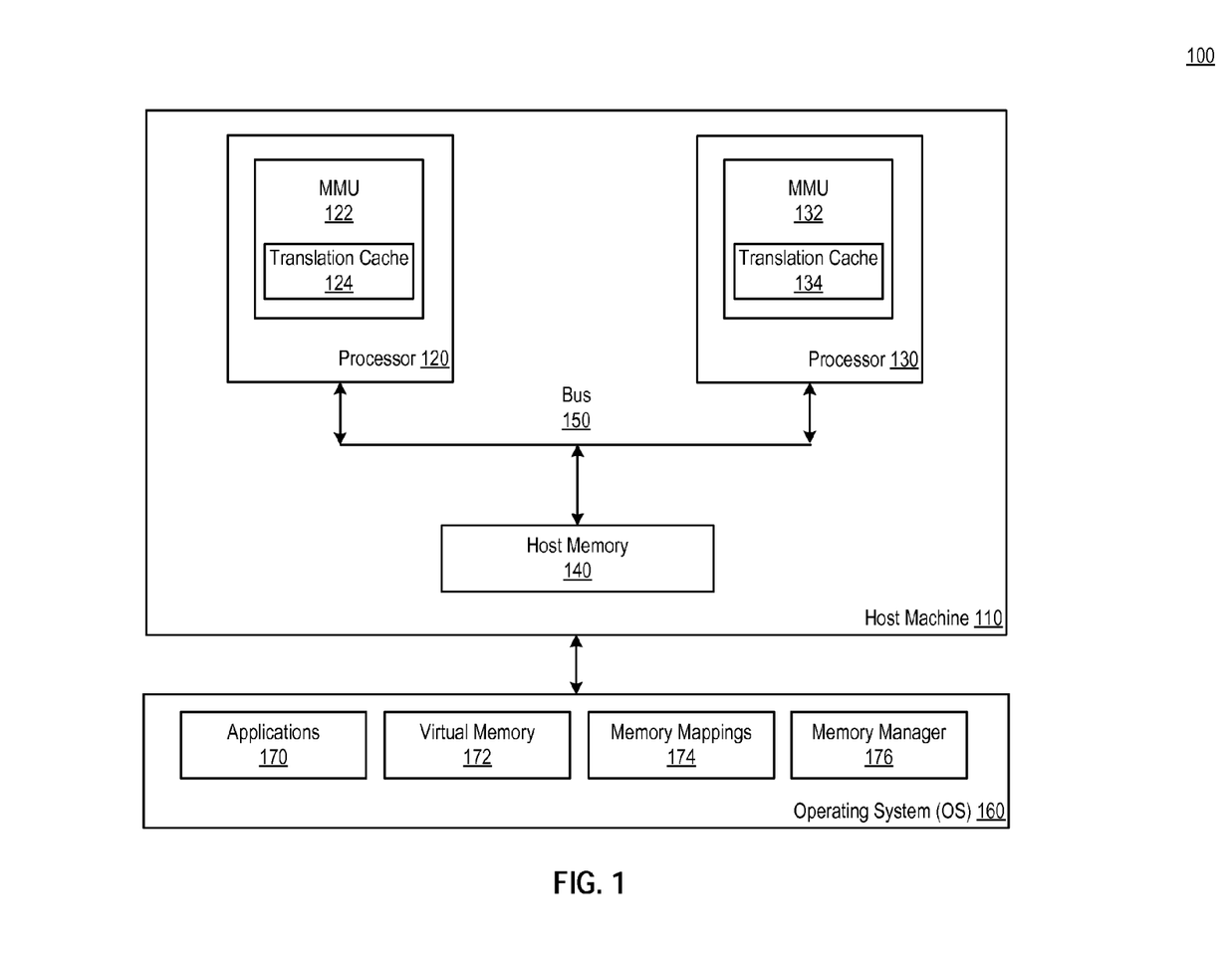
FIG. 1 is a block diagram illustrating an example of a computer system for providing improved cache utilization using reverse copy-on-write operations.

FIG. 1 is a block diagram illustrating an example of a computer system for providing improved cache utilization using reverse copy-on-write operations. Computer system 100 includes host machine 110 and operating system 160.

Host machine 110 may be any computing device, such as a rackmount server, a workstation, a desktop computer, a notebook computer, a tablet computer, a game console, a mobile phone, a palm-sized computing device, a personal digital assistant (PDA), etc. Host machine 110 includes processors 120 and 130, host memory 140, and a bus 150 that couples the processors 120, 130 to the host memory 140.

The term "processor," generally refers to a single processor core. Each processor 120, 130 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

Each processor 120, 130 includes its own respective memory management unit (MMU) 122 and 132. A MMU (e.g., MMU 122 or 132) refers to a hardware component that handles memory management and caching operations of an associated processor. A MMU usually is implemented as part of a processor (i.e., a CPU), and in some examples also may be implemented using a separate integrated circuit.

Each MMU (e.g., MMU 122 and MMU 132) includes its own respective translation cache (e.g., translation cache 124, 134). The term "translation cache" generally refers to cache or other storage that memory management hardware uses to improve the speed of virtual address translation. For example, translation cache 124, 134 may refer to a full or partial "localized" copy of a page table comprising one or more entries mapping pages of virtual memory 172 to pages of host memory 140 (e.g., physical memory).

Translation cache sometimes may be referred to as a "translation lookaside buffer" (TLB) and may include other forms of storage, such as a private array of memory or registers that store a set of page table entries. Memory management hardware (i.e., MMUs 122, 132) may use such localized memory mapping information, for example, to avoid accessing host memory 140 and/or memory mappings 174 each time a virtual memory address is referenced.

Processors 120 and 130 are coupled to host memory 140 via a local bus 150. Host memory 140 may include volatile memory devices (e.g., random access memory (RAM)), non-volatile memory devices (e.g., flash memory), and/or other types of physical memory devices. In this disclosure, units of memory generally are referenced as "pages" and "memory pages" for consistency. However, the scope of this disclosure is not limited to "pages" or "memory pages" per se and also includes any measurable unit(s) of memory, such as blocks, extents, segments, virtual pages, etc.

Host machine 110 may include or communicate with operating system (OS) 160 software that manages computer hardware resources and provides common services for computer programs (e.g., applications 170). Operating system (OS) 160 includes applications 170, virtual memory 172, memory mappings 174, and memory manager 176.

Applications 170 generally refer to software application or computer programs of any type, including system processes, desktop applications, web applications, applications run in a web browser, etc. In an example, applications 170 utilize virtual memory 172 allocated by memory manager 176 and include one or more processes, threads, and/or tasks executed by one or more processors 120, 130.

The term "process" generally refers to an instance of a computer program that is executed. A process may include multiple threads that execute instructions concurrently. The term "thread" generally refers to a collection of program instructions or tasks that may be executed independently. Multiple threads may exist within the same process and share resources, such as memory. The term "task" generally refers to one or more instructions that are executed. In this disclosure "tasks" are generally used in examples for consistency. However, the scope of this disclosure is not limited to "tasks" per se and further applies to applications 170, processes, threads, and other executable units having access to shared memory in computer systems.

Virtual memory 172 is a virtual address space comprising a set of virtual address ranges that an operating system (OS) 160 provides to applications 170. Virtual memory 172 addresses are mapped to physical addresses in host memory 140. Memory manager 176 of operating system (OS) 160 maintains such memory mappings 174, which are referenced and cached by MMUs 122, 132.

Memory mappings 174 is a storage area (e.g., a file, an in-memory data structure, etc.) used to track mappings between virtual memory 172 addresses and host memory 140 addresses. For example, memory mappings 174 may be a data structure used to maintain associations between virtual memory 172 pages and physical pages of host memory 140 used in virtual memory management performed by operating system (OS) 160. For example, memory mappings 174 may be an operating system page table maintained by memory manager 176.

Memory manager 176 is computer software that handles memory management operations for operating system (OS) 160. Memory manager 176 may be part of a core operating system (OS) 160 and also may include one or more extensions that supplement core operating system (OS) 160 functionality.

In an example, memory manager 176 allocates and presents virtual memory 172 addresses to applications 170. Memory manager 176 also maintains memory mappings 174 between virtual memory 172 addresses and physical addresses of host memory 140. Further, memory manager 176 performs operations relating to the management of memory shared between applications, processes, threads, and/or tasks.

In an example, memory manager 176 detects or receives notification that a task seeks to write to a virtual memory 172 address. Memory manager 176 then uses memory mappings 174 to translate the virtual memory 172 address into a physical host memory 140 address. Memory manager 176 then may confirm write permissions are enabled for memory page or adjust the memory page to be writeable so the task may complete the write. Further, recently used memory mappings 174 also may be cached at the processor level (e.g., processor 120, 130) in translation cache (e.g., translation cache 124, 134) of a respective MMU (e.g., MMUs 122, 132).

In an example, memory manager 176 performs a copy-on-write operation when multiple, different tasks share the same memory page and one of the tasks is to update the memory page. In one example, multiple, different tasks may access the same virtual memory 172 address having a read-only entry in memory mappings 174 for as long as no tasks seeks to modify the shared memory page.

When one of the tasks seeks to modify the shared memory page, memory manager 176 performs a copy-on-write operation by (1) creating a new copy of the memory page, (2) adjusting permissions of the new copy of the memory page to make it writable, and (3) modifying memory mappings 174 to allow the task to write to the new copy of the memory page. The task then may perform the write to the new copy of the memory page, while the other tasks continue to reference the original, unmodified and read-only version of the memory page. Thus, a copy-on-write operation allows a task accessing a shared memory page to update a new, writeable copy of the memory page while other tasks continue sharing the original memory page.

However, copy-on-write operations produce several inefficiencies. For example, memory manager 176 first reads the original data to create the copy and then overwrites the copied data in short succession. Further, translation cache (e.g., translation cache 124, 134) is usually flushed to prevent a situation where a version of memory mappings local to a processor (e.g., in translation cache 124, 134) continues to associate the task performing the write with the original, read-only version of the memory page.

In an example, memory manager 176 instead performs a reverse copy-on-write to provide improved cache utilization and performance. For example, memory manager 176 may perform a reverse copy-on-write operation when multiple, different tasks share the same read-only memory page and one of the tasks seeks to update the memory page.

In one example, memory manager 176 performs a reverse copy-on-write operation by (1) detecting when a task is to write to a memory page that is shared with one or more other tasks, (2) creating a new, read-only copy of the memory page for the other task(s) to use, and (3) modifying memory mappings 174 to associate the other task(s) with the new read-only copy of the memory page. Thus, in a reverse copy-on-write, memory manager 176 redirects each non-updating task to a new copy of the memory page rather than redirecting the updating task to a new copy of the memory page.

Reverse copy-on-write operations provide several benefits. First, the active task may perform its write to the memory page without modification of memory mappings 174 or invalidation of translation cache (e.g., translation cache 124, 134). Since the other tasks are remapped and redirected to a different copy, the original memory page can be made writeable memory manager 176. Memory manager 176 also may perform the write on behalf of the active task without modifying permissions of the memory page to be updated. Further, since the other tasks may not be actively running, may not actively run for some period of time, and possibly may not run again, the copy of the memory page may be copied without immediately caching the data and/or new memory mappings 174 at the processor-level. This is in contrast to a traditional copy-on-write where a copy of the memory page is cached at the processor-level immediately because of a write to be performed by the active task.

Figure 2:
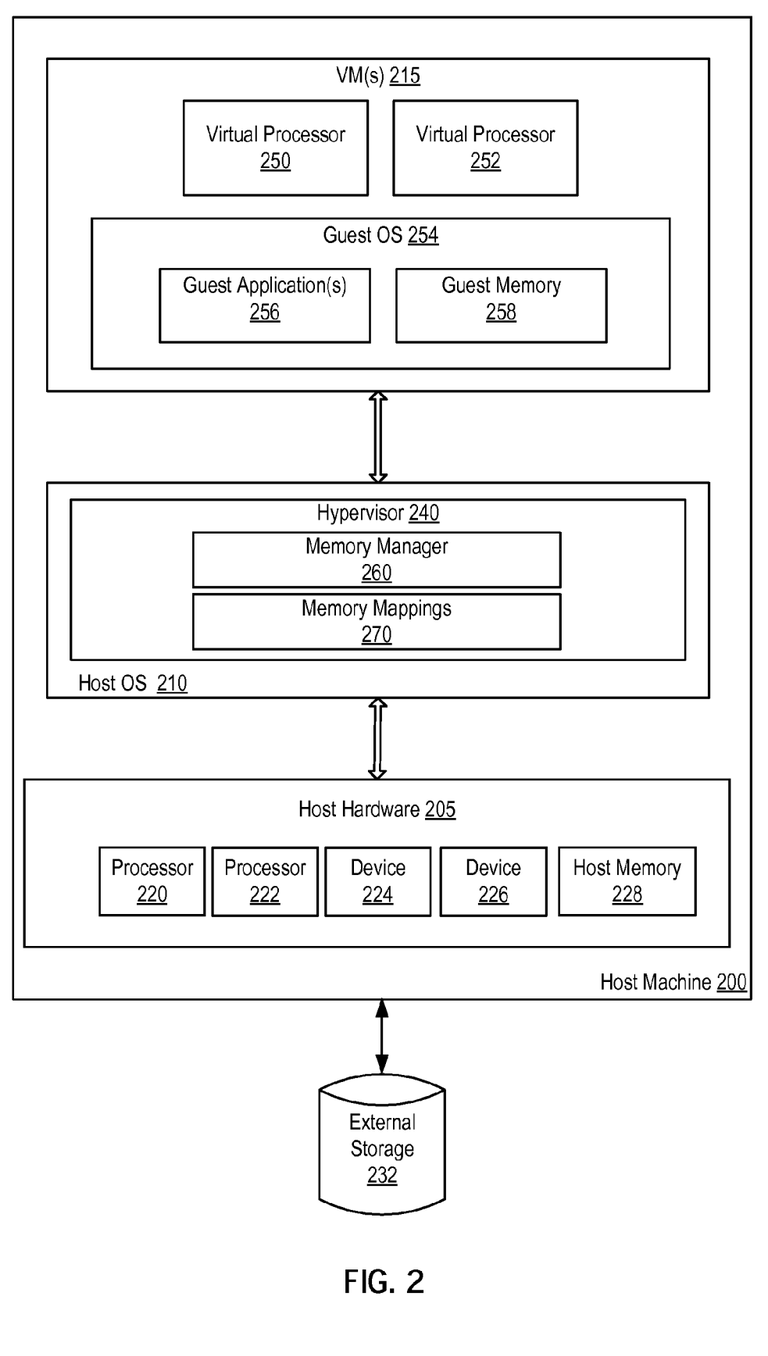
FIG. 2 is a block diagram illustrating an example of a computer system that hosts one or more virtual machines.

FIG. 2 is a block diagram that illustrates an example of a physical computer system, referred to herein as a host machine 200, that hosts one or more virtual machines (VMs) 215. Host machine 200 may be a rackmount server, a workstation, a desktop computer, a notebook computer, a tablet computer, a game console, a mobile phone, a palm-sized computing device, a personal digital assistant (PDA), etc.

Host machine 200 includes host hardware 205, which includes multiple processors 220, 222, multiple devices 224, 226, host memory 228, and other hardware components. Host memory 228 may include volatile memory devices (e.g., random access memory (RAM)), non-volatile memory devices (e.g., flash memory), and/or other types of memory devices. Host hardware 205 also may be coupled to external storage 232 via a direct connection or a local network. Host machine 200 may be a single machine or multiple host machines arranged in a cluster.

In an example, each processor 220, 222 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

A "processing device" generally refers to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 220, 222 are processor cores of the same integrated circuit and share a socket. Processors that share a socket may communicate with one another more efficiently than processors that do not share a socket.

Each of the devices 224, 226 may be a physical device that is internal or external to host machine 200. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 232), external I/O devices, etc. Devices 224, 226 communicate with host machine 200 (e.g., notify host machine 200 of events) by generating device interrupts.

Host machine 200 includes a hypervisor 240 (also known as a virtual machine monitor (VMM)). In one example (as shown), hypervisor 240 is a component of a host operating system 210. Alternatively, hypervisor 240 may run on top of a host OS 210, or may run directly on host hardware 205 without the use of a host OS 210.

Hypervisor 240 manages system resources, including access to host memory 228, devices 224, 226, secondary storage, and so on. Hypervisor 240, though usually implemented in software, may emulate and export a bare machine interface (host hardware 205) to higher-level software. Such higher-level software may comprise a standard or real-time operating system (OS), may be a highly stripped down operating environment with limited operating system functionality, may not include traditional OS facilities, etc. Hypervisor 240 presents to other software (i.e., "guest" software) the abstraction of one or more virtual machines (VMs) 215, which may provide the same or different abstractions to various guest software (e.g., guest operating system, guest applications).

Host machine 200 hosts any number of virtual machines (VMs) 215 (e.g., a single VM, one hundred VMs, etc.). A virtual machine 215 is a combination of guest software that uses an underlying emulation of host machine 200 (e.g., as provided by hypervisor 240). Guest software may include a guest operating system 254, guest applications 256, guest memory 258, guest device drivers (not shown), etc. Virtual machines 215 can be, for example, hardware emulation, full virtualization, para-virtualization, and operating system-level virtualization virtual machines. Virtual machines 215 may have the same or different guest operating systems 254, such as Linux®, Solaris®, Microsoft® Windows®, etc.

Guest memory 258 generally describes memory allocated to and available for use by a guest OS 254. In an example, guest memory 258 may be memory presented to guest OS 254 by hypervisor 240. In one example, guest memory 258 is mapped to and provided using corresponding memory from a host machine 200 (e.g., host memory 228). For example, a page (or other unit) of guest memory 258 may be mapped to and provided using a corresponding page (or other unit) of host memory 228.

Each virtual machine 215 may include multiple virtual processors 250, 252. Each virtual processor 250, 252 of a virtual machine 215 executes on a specific processor 220, 222 of host machine 200. Hypervisor 240 may control which virtual processors 250, 252 run on which hardware processors 220, 222. For example, virtual processor 250 may run on processor 220, and virtual processor 252 may run on processor 222 (or vice versa).

Hypervisor 240 includes a memory manager 260 and memory mappings 270. In an example, memory manager 260 tracks and manages mappings between guest memory 256 and host memory 228 using memory mappings 270. For example, memory manager 260 may maintain a table, list or other data structure that associates an address of guest memory 256 (e.g., a guest address) with an address of corresponding host memory 228 (e.g., a host address). A "guest address" generally may refer to either a virtual or physical guest memory address. In addition, a "host address" generally may refer to either a virtual or physical host memory address.

In an example, memory manager 260 is a module that performs memory management operations for hypervisor 240. For example, memory manager 260 may perform various shared memory management operations, such as reverse copy-on-write operations for hypervisor 240 of host OS 210.

In an example, a memory manager 260 of a hypervisor 240 performs a reverse-copy-on write operation by detecting when a first virtual machine is to write to a memory page shared with a second virtual machine, determining that the second virtual machine shares the memory page with the first virtual machine, creating a copy of the memory page for the second virtual machine, modifying one or more memory mappings 270 to associate the second virtual machine with the copy of the memory page and modifying access to the memory page to allow the first virtual machine to write to the memory page. In one example, memory manager 260 performs the write to the memory page on behalf of the first virtual machine without modifying access or permission to the memory page.

In general, examples presented in this disclosure with respect to physical computer systems also may be applied similarly to virtualized computer systems. For example, while a memory manager 176 of a physical computer system may perform reverse copy-on-write operations involving a plurality of tasks, threads, processes or applications 170 having access to the same shared memory, a memory manager 260 of a hypervisor 240 associated with a host OS 210 may perform reverse copy-on-write operations involving a plurality of virtual machines having access to the same shared memory. Thus, examples of reverse copy-on-write operations presented in the context of physical systems may be applied similarly to virtualized computer systems. Further, examples presented in the context of physical computer systems or virtualized computer systems are not intended to be limiting and may be applied similarly in other contexts.

Figure 3:
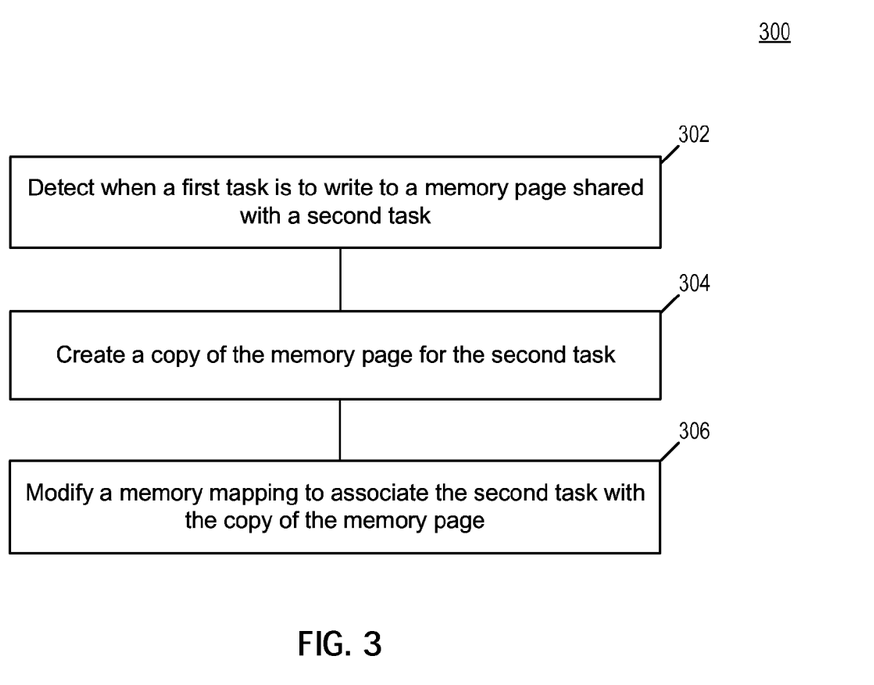
FIG. 3 is a flow diagram illustrating an example of a method for performing a reverse copy-on-write operation to provide improved cache utilization.

FIG. 3 is a flow diagram illustrating an example of a method for performing a reverse copy-on-write operation to provide improved cache utilization. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 300 is performed by memory manager 176 of FIG. 1. In one example, the method 300 is performed by memory manager 260 of hypervisor 240 in FIG. 2 with respect to virtual machines (rather than tasks). Examples will be discussed in the context of memory manager 176 for the purpose of consistency. However, such examples are applicable to both physical computer systems and/or virtualized computer systems.

Method 300 begins at block 302 when memory manager 176 detects when a first task is to write to a memory page shared with a second task. In an example, memory manager 176 may receive an indication or determine that the first task intends to write to the memory page. Memory manager 176 then may determine whether one or more other tasks share the memory page with the first task. In one example, memory manager 176 performs a reverse copy-on-write operation to allow the first task to update the memory page when memory manager 176 determines that the first task shares the memory page with one or more other tasks.

At block 304, memory manager 176 creates a copy of the memory page for the second task. In an example, memory manager 176 creates a new, read-only copy of the memory page for the second task to use. For example, memory manager 176 creates the new copy of the memory page to allow the pending write to be applied to the original memory page.

At block to allow 306, memory manager 176 modifies a memory mapping to associate the second task with the copy of the memory page. In an example, memory manager 176 modifies memory mappings 174 associated with each of the other tasks determined to be sharing the memory page with the first task. For example, memory manager 176 modifies memory mappings 174 of the other tasks so that the other tasks point to or reference the new, read-only copy of the memory page created at block 304.

In an example, memory manager 176 modifies access permission to the original memory page to allow the first task to write to the memory page. For example, memory manager 176 may modify the permission associated with the memory page in memory mappings 174 to allow the first task to write to the memory page. In one example, memory manager 176 does not modify access permission to the memory page, and instead executes the write to the memory page on behalf of the first task. In one example, the write may be executed on behalf of the first task concurrently when creating the copy of the memory page for the second task.

Figure 4:
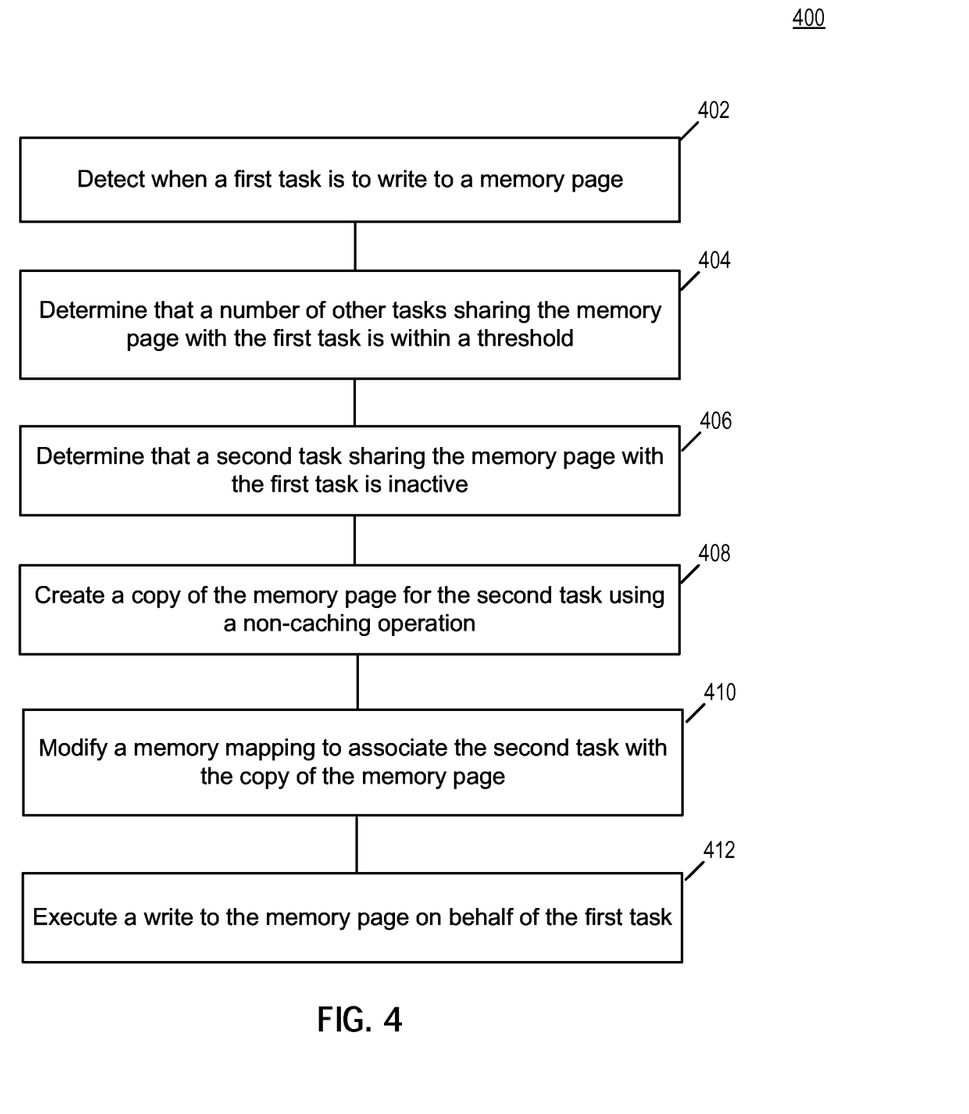
FIG. 4 is a flow diagram illustrating an example of a method for performing a reverse copy-on-write using a non-caching operation.

FIG. 4 is a flow diagram illustrating an example of a method for performing a reverse copy-on-write using a non-caching operation. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 400 is performed by memory manager 176 of FIG. 1. In one example, the method 400 is performed by memory manager 260 of hypervisor 240 in FIG. 2 with respect to virtual machines. Examples will be discussed in the context of memory manager 176 for the purpose of consistency. However, such examples are applicable to both physical computer systems and/or virtualized computer systems.

Method 400 begins at block 402 when memory manager 176 detects when a first task is to write to a memory page. In an example, memory manager 176 receives an indication or intercepts a write that the first task intends to apply to the memory page. In one example, memory manager 176 determines whether one or more other tasks share the memory page with the first task in response to detecting that the first task is to write to the memory page.

At block 404, memory manager 176 determines that a number of other tasks sharing the memory page with the first task is within a threshold. In an example, memory manager 176 determines the number of other tasks that share the memory page with the first task. For example memory manager 176 may examine memory mappings 174 to determine how many other tasks, if any, share the memory page with the first task. Once memory manager 176 is aware of the number of other tasks that share the memory page with the first task, then memory manager 176 compares the count to a reverse copy-on-write threshold.

In an example, memory manager 176 determines that it will perform a reverse copy-on-write operation when the number of other tasks sharing memory page does not exceed the copy-on-write threshold. In one example, memory manager 176 determines that it will perform a traditional copy-on-write operation when the number of other tasks sharing memory page with the first task exceeds the threshold.

In an example, memory manager 176 examines translation cache (e.g., translation cache 124, 134) of processors 120, 130 to determine whether any memory mappings 174 for the second task are stored in the translation cache. In one example, memory manager 176 performs a reverse copy-on-write operation when determining that memory mappings 174 for the second task are not present in translation cache (e.g., translation cache 124, 134). In one example, memory manager 176 performs a regular copy-on-write operation when determining that memory mappings 174 exist in translation cache 124, 134 of one or more processors 120, 130.

At block 406, memory manager 176 determines that a second task sharing the memory page with the first task is inactive. In an example, memory manager 176 examines the second task or examines information collected or observed about the second task to determine that the second task is inactive. In one example, memory manager 176 compares the amount of time that elapsed since the last activity performed by the second task to an inactivity threshold when determining whether to classify the second task as inactive.

At block 408, memory manager 176 creates a copy of the memory page for the second task using a non-caching operation. In an example, memory manager 176 uses a non-caching operation to create the copy of the memory page for the second task in response to determining that the second task is inactive. A non-caching operation, which also may be referred to or described as a non-temporal operation, generally refers to creating a copy of the memory page for the second task without placing the copy into a processor's cache. Thus, the data copying may be performed asynchronously in two or more steps. First, a copy of the memory page is created and the data is later moved into processor cache when possible or requested, for example, when the second task transitions from inactive to active. In one example, a non-caching operation is performed by copying the data independently from any processor 120, 130 using a direct memory access (DMA) operation.

At block 410, memory manager 176 modifies a memory mapping 174 to associate the second task with the copy of the memory page. In an example, memory manager 176 also modifies memory mappings 174 associated with each of one or more other tasks determined to be sharing the memory page with the first task. For example, memory manager 176 modifies memory mappings 174 of the other tasks so that the other tasks point to (i.e., reference) the new copy of the memory page.

At block 412, memory manager 176 executes write to the memory page on behalf of the first task 140. In an example, memory manager 176 executes the write to the memory page on behalf of the first task instead of modifying access permission to the memory page (i.e., by making the memory page writeable). In one example, the write may be executed on behalf of the first task while memory manager 176 is performing copying of the memory page for the second task using a non-caching operation.

Figure 5:
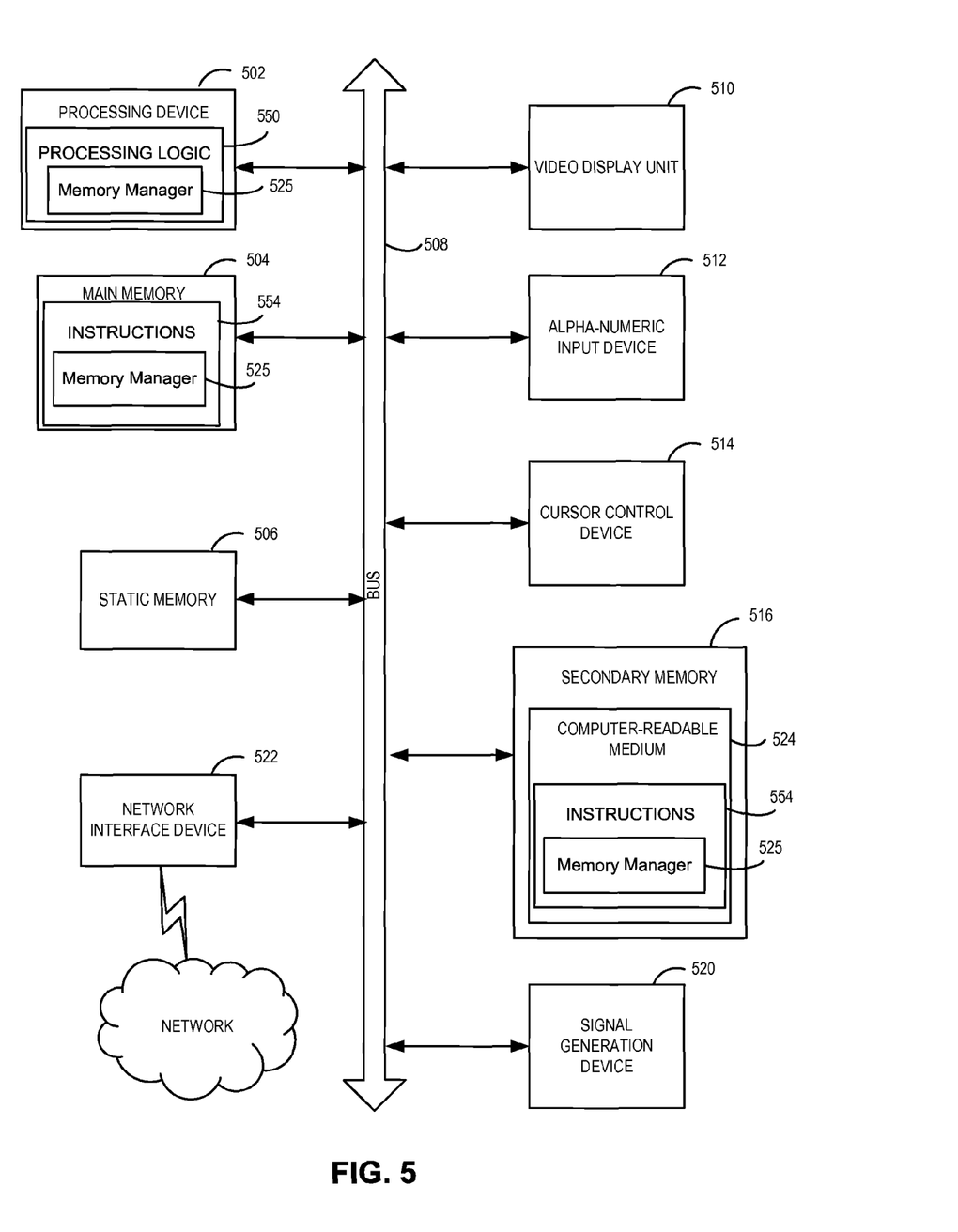
FIG. 5 illustrates a diagrammatic representation of a machine in the example form of a computer system.

FIG. 5 illustrates a diagrammatic representation of a machine in the example form of a computer system 500 within which a set of instructions, for causing the machine to perform any one or more of the methodologies discussed herein, may be executed. The computer system 500 may correspond, for example, to host machine 110 of FIG. 1 or host machine 202 of FIG. 2.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 554 embodying any one or more of the methodologies or functions described herein (e.g., memory manager 525). The instructions 554 may also reside, completely or at least partially, within the main memory 504 and/or within the processing device 502 (e.g., processing logic 550) during execution thereof by the computer system 500 (the main memory 504 and the processing device 502 constituting machine-readable storage media).

While the computer-readable storage medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 may additionally include a memory manager module (not shown) for implementing the functionalities of memory manager 174 or memory manager 260. The modules, components and other features described herein (for example, in relation to FIG. 1 and FIG. 2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "processing", "executing", "modifying", "creating", "detecting," "copying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
   detecting, by a processor, when a first task is to write to a memory page shared with a second task;
   determining, by the processor, whether a number of other tasks sharing the memory page with the first task is within a threshold;
   creating, by the processor, a copy of the memory page for the second task; and
   modifying, by the processor, a memory mapping to associate the second task with the copy of the memory page.

2. The method of claim 1, further comprising:
   determining, by the processor, that the second task shares the memory page with the first task.

3. The method of claim 1, further comprising:
   modifying, by the processor, access to the memory page to allow the first task to write to the memory page.

4. The method of claim 1, further comprising:
   executing, by the processor, a write to the memory page on behalf of the first task.

5. The method of claim 4, wherein the write is executed on behalf of the first task when creating the copy of the memory page for the second task.

6. The method of claim 4, wherein the write is executed on behalf of the first task instead of modifying the memory page to be writable.

7. The method of claim 1, wherein the creating and the modifying are performed in view of determining that the number of other tasks sharing the memory page is within the threshold.

8. The method of claim 1, further comprising:
   determining, by the processor, whether the second task has a cached memory mapping for the memory page.

9. The method of claim 8, wherein the creating and the modifying are performed in view of determining that the second task does not have a cached memory mapping for the memory page.

10. The method of claim 1, further comprising:
    determining, by the processor, that the second task is inactive.

11. The method of claim 1, wherein the copy is created using a non-caching operation.

12. The method of claim 11, wherein the non-caching operation is performed in view of determining that the second task is inactive.

13. The method of claim 1, wherein the first task is to write to a memory page shared with a plurality of other tasks.

14. A system, comprising:
    a memory; and
    a processor coupled to the memory to:
      detect when a first task is to write to a memory page shared with a second task;
      determine whether a number of other tasks sharing the memory page with the first task is within a threshold;
      create a copy of the memory page for the second task; and
      modify a memory mapping to associate the second task with the copy of the memory page.

15. The system of claim 14, wherein the processor further is to:
determine that the second task shares the memory page with the first task.

16. The system of claim 14, wherein the processor further is to:
modify access to the memory page to allow the first task to write to the memory page.

17. The system of claim 14, wherein the processor further is to:
determine that the second task shares the memory page with the first task.

18. The system of claim 14, wherein the processor further is to:
modify access to the memory page to allow the first task to write to the memory page.

19. The system of claim 14, wherein the processor further is to:
execute a write to the memory page on behalf of the first task.

20. The system of claim 19, wherein the write is executed on behalf of the first task when creating the copy of the memory page for the second task.

21. The system of claim 19, wherein the write is executed on behalf of the first task instead of modifying the memory page to be writable.

22. The system of claim 14, wherein the creating and the modifying are performed in view of determining that the number of other tasks sharing the memory page is within the threshold.

23. The system of claim 14, wherein the processor further is to:
determine whether the second task has a cached memory mapping for the memory page.

24. The system of claim 23, wherein the creating and the modifying are performed in view of determining that the second task does not have a cached memory mapping for the memory page.

25. The system of claim 14, wherein the copy is created using a non-caching operation.

26. The system of claim 25, wherein the non-caching operation is performed in view of determining that the second task is inactive.

27. The system of claim 14, wherein the first task is to write to a memory page shared with a plurality of other tasks.

28. A non-transitory computer-readable medium having instructions recorded thereon, that when executed by a processor, cause the processor to perform operations, comprising:
detecting, by a hypervisor executed by a processor, when a first virtual machine is to write to a memory page shared with a second virtual machine;
determining, by the hypervisor, whether a number of other tasks sharing the memory page with the first virtual machine is within a threshold;
creating, by the hypervisor, a copy of the memory page for the second virtual machine; and
modifying, by the hypervisor, a memory mapping to associate the second virtual machine with the copy of the memory page.

29. The non-transitory computer-readable storage medium of claim 28, the operations further comprising:
determining, by the hypervisor, that the second virtual machine shares the memory page with the first virtual machine.

30. The non-transitory computer-readable storage medium of claim 28, the operations further comprising:
modifying, by the hypervisor, access to the memory page to allow the first virtual machine to write to the memory page.

31. The non-transitory computer-readable storage medium of claim 28, the operations further comprising:
determining, by the hypervisor, that the second virtual machine shares the memory page with the first virtual machine.

32. The non-transitory computer-readable storage medium of claim 28, the operations further comprising:
modifying, by the hypervisor, access to the memory page to allow the first virtual machine to write to the memory page.

33. The non-transitory computer-readable storage medium of claim 28, the operations further comprising:
executing, by the hypervisor, a write to the memory page on behalf of the first virtual machine.

34. The non-transitory computer-readable storage medium of claim 28, wherein the write is executed on behalf of the first virtual machine when creating the copy of the memory page for the second task.

35. The non-transitory computer-readable storage medium of claim 34, wherein the write is executed on behalf of the first virtual machine instead of modifying the memory page to be writable.

36. The non-transitory computer-readable storage medium of claim 28, wherein the creating and the modifying are performed in view of determining that the number of other virtual machines sharing the memory page is within the threshold.

37. The non-transitory computer-readable storage medium of claim 28, the operations further comprising:
determining, by the hypervisor, whether the second virtual machine has a cached memory mapping for the memory page.

38. The non-transitory computer-readable storage medium of claim 37, wherein the creating and the modifying are performed in view of determining that the second virtual machine does not have a cached memory mapping for the memory page.

39. The non-transitory computer-readable storage medium of claim 28, wherein the copy is created using a non-caching operation.

40. The non-transitory computer-readable storage medium of claim 39, wherein the non-caching operation is performed in view of determining that the second virtual machine is inactive.

41. The non-transitory computer-readable storage medium of claim 28, wherein the first virtual machine is to write to a memory page shared with a plurality of other virtual machines.

* * * * *